United States Patent
Park et al.

(10) Patent No.: US 7,701,607 B2
(45) Date of Patent: Apr. 20, 2010

(54) METHOD AND DEVICE FOR MANAGING IMAGES STORED IN A PLURALITY OF STORAGE MEDIA INCLUDED IN OR CONNECTED TO IMAGE FORMING APPARATUS

(75) Inventors: Sang-hyun Park, Suwon-si (KR); Sang-hyup Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 874 days.

(21) Appl. No.: 11/528,259

(22) Filed: Sep. 28, 2006

(65) Prior Publication Data
US 2007/0091367 A1   Apr. 26, 2007

(30) Foreign Application Priority Data
Oct. 20, 2005   (KR)   ...................... 10-2005-0099330
Oct. 31, 2005   (KR)   ...................... 10-2005-0103271

(51) Int. Cl.
  *G06F 15/00*   (2006.01)
  *G06F 13/12*   (2006.01)
(52) U.S. Cl. ...................... 358/1.16; 710/62
(58) Field of Classification Search ............... 358/1.16, 358/1.15, 1.14, 1.13, 1.2, 487, 497, 474; 710/1, 62, 72, 104, 303; 715/738; 705/1, 705/15, 14.39, 810; 361/737; 455/419, 418, 455/420, 557, 649
See application file for complete search history.

(56) References Cited

U.S. PATENT DOCUMENTS
2005/0200885 A1 *  9/2005  Nishizawa et al. ......... 358/1.15

FOREIGN PATENT DOCUMENTS
| JP | 09-051420 | 2/1997 |
| JP | 11-308424 | 11/1999 |
| JP | 2003-009042 | 1/2003 |
| JP | 2004-185535 | 7/2004 |

(Continued)

*Primary Examiner*—Saeid Ebrahimi Dehkordy
(74) *Attorney, Agent, or Firm*—Roylance, Abrams, Berdo & Goodman, LLP (57) ABSTRACT

A method and device for managing images stored in a plurality of storage media by using a display unit included in an image forming apparatus to prints the images are provided. The method includes: displaying identification names of a plurality of storage media included in or connected to the image forming apparatus; and linking information on images stored in the plurality of storage media with the identification names of the plurality of storage media and displaying the information on images stored in the plurality of storage media. Accordingly, the identification names of the plurality of storage media included in or connected to the image forming apparatus are displayed by linking information on images with the identification names in order to manage the images stored in the storage media. Therefore, a user can conveniently and promptly recognize and manage the storage media and the images stored in the storage media. In addition, since the plurality of storage media are controlled concurrently, image data can be promptly read from or written to the storage media, and data transfer speed between the storage media can be increased.

20 Claims, 9 Drawing Sheets

FOREIGN PATENT DOCUMENTS

| | | |
|---|---|---|
| JP | 2004-320743 | 11/2004 |
| JP | 2005-102034 | 4/2005 |
| JP | 2005-111943 | 4/2005 |
| KR | 10-2005-0005156 | 1/2005 |

* cited by examiner

| A:\ | B:\ | C:\ |
|---|---|---|
| IMAGE A-1 | IMAGE B-1 | IMAGE C-1 |
| IMAGE A-2 | IMAGE B-2 | IMAGE C-2 |
| IMAGE A-3 | IMAGE B-3 | IMAGE C-3 |

| HARD DISK | USB MEMORY STICK | MEMORY CARD |
|---|---|---|
| IMAGE A-1 | IMAGE B-1 | IMAGE C-1 |
| IMAGE A-2 | IMAGE B-2 | IMAGE C-2 |
| IMAGE A-3 | IMAGE B-3 | IMAGE C-3 |

| USB MEMORY STICK | | |
|---|---|---|
| IMAGE B-1 | IMAGE B-4 | IMAGE B-7 |
| IMAGE B-2 | IMAGE B-5 | IMAGE B-8 |
| IMAGE B-3 | IMAGE B-6 | IMAGE B-9 |

| HARD DISK | USB MEMORY STICK | MEMORY CARD | CARD READER |
|---|---|---|---|
| IMAGE A-1 | IMAGE B-1 | IMAGE C-1 | IMAGE D-1 |
| IMAGE A-2 | IMAGE B-2 | IMAGE C-2 | IMAGE D-2 |
| IMAGE A-3 | IMAGE B-3 | IMAGE C-3 | IMAGE D-3 |

METHOD AND DEVICE FOR MANAGING IMAGES STORED IN A PLURALITY OF STORAGE MEDIA INCLUDED IN OR CONNECTED TO IMAGE FORMING APPARATUS

CROSS-REFERENCE TO RELATED PATENT APPLICATION

This application claims the benefit under 35 U.S.C. §119(a) of Korean Patent Application No. 10-2005-0099330, filed Oct. 20, 2005 and Korean Patent Application No. 10-2005-0103271, filed Oct. 31, 2005, in the Korean Intellectual Property Office, the entire disclosures of which are hereby incorporated by reference.

BACKGROUND OF THE INVENTION

1. Field of the Invention

The present invention relates to an image forming apparatus for printing images stored in a plurality of storage media. More particularly, the present invention relates to a method and device for managing images stored in the plurality of storage media by using a display unit included in the image forming apparatus.

2. Description of the Related Art

In image forming apparatuses, documents to be printed are converted into encoded data through application programs, and the encoded data is then printed on paper in a readable format.

Recently developed image formatting apparatuses use a memory card or a universal serial bus (USB) memory stick storing image data to facilitate the printing the image data directly from the external storage media, or to include a big capacity hard disk.

To print image data from a memory card, the image forming apparatus includes a display unit such as a liquid crystal display (LCD) to display images stored in the memory card. The LCD permits a user to select an image to be printed after verifying the images. The display unit included in the image forming apparatus has an N-up function to display a plurality of images stored in the memory card on one screen.

Figure 1:
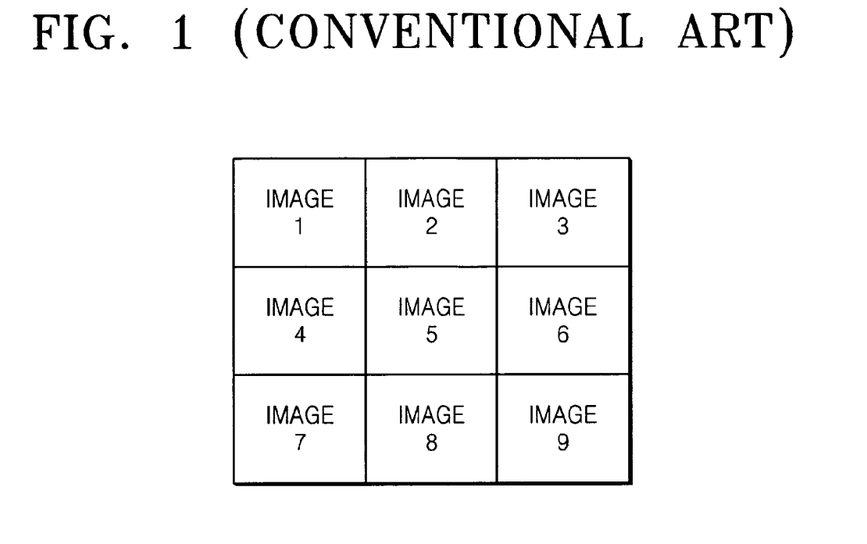
FIG. 1 illustrates a conventional method of displaying images stored in storage media for an image forming apparatus.

FIG. 1 illustrates an N-up display which displays a plurality of images on one screen. When the user selects a hard disk included in the image forming apparatus or an external storage medium connected to the image forming apparatus, images stored in the selected storage medium are displayed on the screen, as illustrated in FIG. 1.

However, even when a plurality of storage media are connected to the image forming apparatus, the user only obtain information on images stored in the storage medium selected by the user. Therefore, images cannot be transferred between storage media, resulting in ineffective management of the images stored in the plurality of storage media.

Accordingly, there is a need for an improved system and method for effectively managing images stored in a plurality of storage media included in or connected to an image forming apparatus.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and device for effectively managing images stored in a plurality of storage media included in or connected to an image forming apparatus.

An exemplary embodiment of the present invention also provides a method and device for controlling a plurality of storage media connected to an image forming apparatus to conveniently and promptly manage stored images.

According to an aspect of an exemplary embodiment of the present invention, a method of managing images to be printed by an image forming apparatus is provided. Identification names of a plurality of storage media included in or connected to the image forming apparatus are displayed. Information on images stored in the plurality of storage media is linked with the identification names of the plurality of storage media and the information on images stored in the plurality of storage media is displayed.

According to an exemplary embodiment of the present invention, the plurality of storage media may comprise a hard disk, a memory card, a universal serial bus (USB) memory stick, or a card reader.

The information on images may also be displayed in an enlarged or reduced form so that the images are adjusted to the size of an image display area.

Also, the identification names of the storage media may be displayed in a first alignment manner in which the identification names of the storage media are horizontally displayed and the information on the images stored in the storage media is displayed vertically in a column of the corresponding identification names of the storage media. Alternatively, the identification names of the storage media may be displayed in a second alignment manner in which the identification names of the storage media are vertically displayed and the information on the images stored in the storage media is horizontally displayed in a row of the corresponding identification names of the storage media.

The first alignment manner or the second alignment manner may be selected by a user.

In addition, the identification names of the storage media may be horizontally or vertically displayed, and the information on the images stored in the storage media may be horizontally or vertically displayed in the same row or column of the corresponding storage media in which the images are stored.

When two and more images are stored in the storage media, information on images is displayed by determining a display order of the images according to an image date, a file format, a file name, or exchangeable image file (Exif) information and by displaying the information on the images according to the determined display order.

Any one of the displayed identification names of the storage media may be input by a user and images stored in a storage medium corresponding to the input identification name may be displayed.

Directory names of the storage media may be displayed and information on images stored in each directory may be linked with the displayed directory names. Also, the information on images stored in each directory may be displayed.

Any one of the images may be selected by a user using the displayed image information. The selected image may be read from the storage media where the image is stored and the selected image may be printed using read image data.

According to an exemplary implementation, a storage medium's connection to or disconnection from the image forming apparatus is verified. The size of a display area for displaying information of one image is arranged according to the number of storage media included in or connected to the image forming apparatus, when the result of the verification indicates that a storage medium has been connected to or disconnected from the image forming apparatus.

Further, the identification names of the storage media and the information on the images may be respectively linked by heads and tails connected to the heads, and may be stored in and managed by the image forming apparatus.

According to anther aspect of an exemplary embodiment of the present invention, a device for managing images is provided. The device is included in an image forming apparatus and comprises a storage medium managing unit, a control unit, and a display unit. The storage medium managing unit reads information on images stored in a plurality of storage media included in or connected to the image forming apparatus. The control unit determines identification names of the plurality of storage media and respectively links the images stored in the storage media with the identification names of the storage media. The display unit displays the identification names of the plurality of storage media and the image information.

According to an exemplary implementation, the plurality of storage media may comprise a hard disk, a memory card, a universal serial bus (USB) memory stick, or a card reader.

The information on images may also be displayed in enlarged or reduced form so that the images are adjusted to the size of an image display area.

Also, the display unit may horizontally display the identification names of the storage media in a first alignment manner in which the identification names of the storage media are horizontally displayed and the information on the images stored in the storage media is displayed vertically in a column of the corresponding identification names of the storage media. Alternatively, the identification names of the storage media may be displayed in a second alignment manner in which the identification names of the storage media are vertically displayed and the information on the images stored in the storage media is horizontally in a row of the corresponding identification names of the storage media.

In addition, the first alignment manner or the second alignment manner can be selected by a user.

When two and more images are stored in the storage media, the control unit may determine a display order of the images according to an image date, a file format, a file name, or exchangeable image file (Exif) information, and may display the information on the images according to the determined display order.

The storage medium managing unit may verify a storage medium's connection to or disconnection from the image forming apparatus. The control unit may arrange the size of a display area for displaying information of one image according to the number of storage media included in or connected to the image forming apparatus, when the result of the verification indicates that a storage medium has been connected to or disconnected from the image forming apparatus.

In addition, the storage medium managing unit may concurrently access the plurality of storage media.

According to another aspect of an exemplary embodiment of the present invention, a method of controlling a plurality of storage media included in or connected to an image forming apparatus is provided Each controller controlling the plurality of storage media is independently configured and the plurality of storage media is concurrently accessed using the configured controllers to read data stored in the storage media or write the data to the storage media.

According to an exemplary implementation, the plurality of storage media may comprise a hard disk, a memory card, a universal serial bus (USB) memory stick, or a card reader.

According to anther aspect of an exemplary embodiment of the present invention, a device for controlling a plurality of storage media included in or connected to an image forming apparatus is provided. A file system for the storage media stores information required for controlling the storage media. A driver for the storage media generates signals for controlling the storage media. A controller for the storage media controls the storage media using the generated signals, wherein the plurality of storage media is controlled concurrently.

According to an exemplary implementation, the information required for controlling the storage media may include location information of files stored in the storage media, capacity of the storage media, or sector size.

The file systems, the drivers, and the controllers for the storage media may be independent from one other.

An exemplary embodiment of the present invention also provides a computer-readable medium comprising a computer program for executing the method of managing images and the method of controlling storage media.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF THE INVENTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a method and device for managing images stored in a plurality of storage media included in or connected to an image forming apparatus, and a method and device for concurrently controlling the plurality of storage media according to an exemplary embodiment of the present invention will be described in detail by explaining exemplary embodiments of the invention with reference to the attached drawings.

Figure 2:
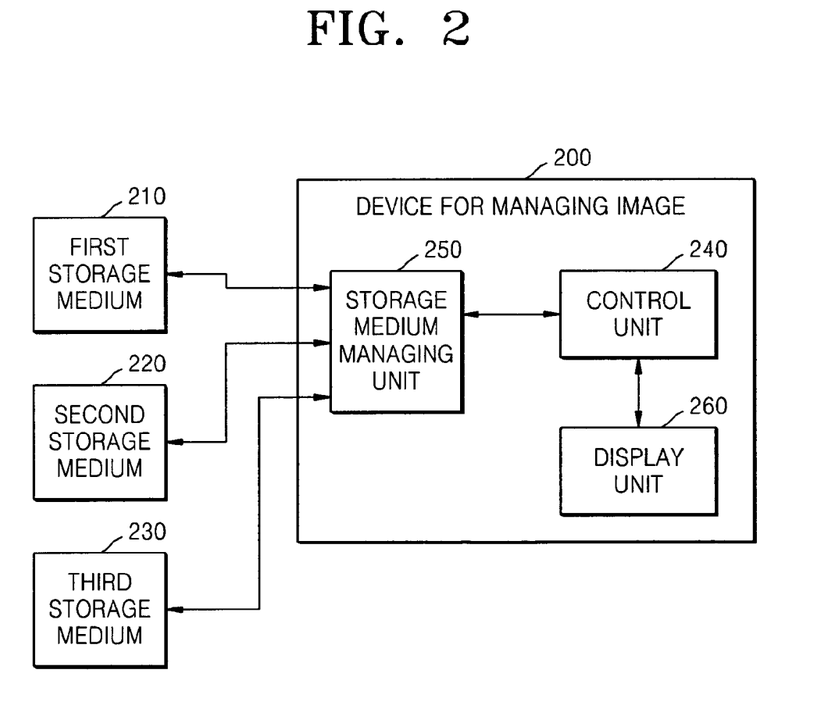
FIG. 2 is a block diagram of a device for managing images, according to an exemplary embodiment of the present invention.

FIG. 2 is a block diagram of a device for managing images, according to an exemplary embodiment of the present invention. The device 200 includes a storage medium managing unit 250, a control unit 240, and a display unit 260. The operation of the device 200 will be described with reference to FIG. 9 which is a flowchart of a method of managing images, according to an exemplary embodiment of the present invention.

The storage medium managing unit 250 accesses storage media included in an image forming apparatus connected to the image forming apparatus, to read information of images stored in the plurality of storage media. For example, the storage medium managing unit 250 accesses first, second, and third external storage media 210, 220, and 230 to read information of images stored in the plurality of storage media. Examples of the plurality of storage media include a hard disk included in the image forming apparatus, a memory card connected to the image forming apparatus, a universal serial bus (USB) memory stick, and a card reader. The memory card may be a compact flash (CF) memory card, a smart media (SM) memory card, an extreme digital (XD) memory card, a memory stick (MS), a secure digital (SD) memory card, and a multimedia card (MMC).

Image information read from the storage media may include information on an image file and an image attribute. The image attribute information may include an image file name, a file format, an image date, an image size, or exchangeable image file (Exif) information.

Figure 9:
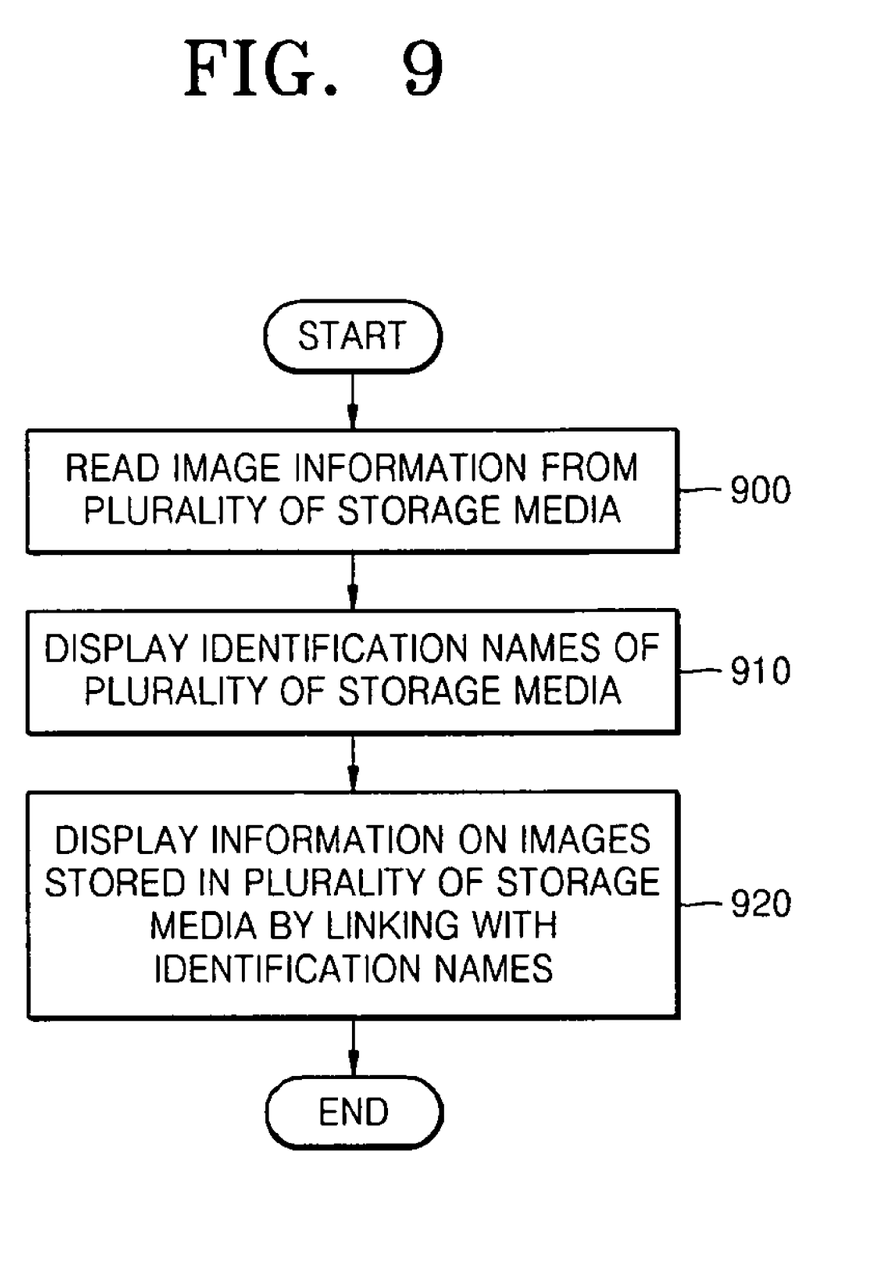
FIG. 9 is a flowchart illustrating a method of managing images, according to an exemplary embodiment of the present invention.

The control unit 240 respectively determines identification names of the plurality of storage media. For example, the control unit 240 determines identification names of the first, second, and third storage media 210, 220, and 230, and displays the determined identification names on the display unit 260 (step 910). The identification names for identifying the plurality of storage media may be a letter or a name.

The control unit 240 links the image information which is read from the respective storage media with the identification names of the storage media, and displays the image information on the display unit 260 (step 920). The displayed image information corresponding to the identification names may be a thumbnail image or a reduced image.

Figure 3:
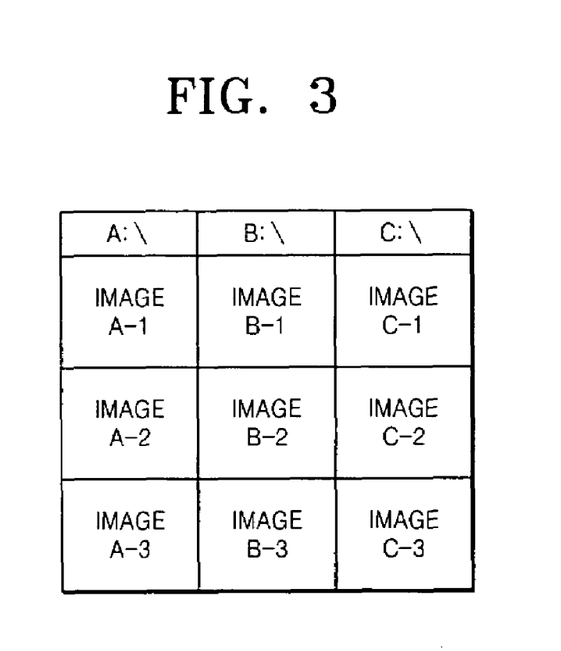
FIG. 3 illustrates a method of displaying images stored in storage media according to identification names of a plurality of storage media, according to an exemplary embodiment of the present invention.

FIG. 3 illustrates a method of displaying images stored in the storage media according to identification names of the first, second, and third storage media 210, 220, and 230, according to an exemplary embodiment of the present invention. Here, the identification names of the storage media 210, 220, and 230 are horizontally displayed, and images stored in the storage medium are vertically displayed. Identification names "A:\", "B:\", and "C:\" are respectively given to the first, second, and third storage media 210, 220, and 230. Images A-1, A-2, and A-3 stored in the first storage medium 210 are vertically displayed below the identification name "A:\" of the first storage medium 210. Images B-1, B-2, and B-3 stored in the second storage medium 220 are vertically displayed below the identification name "B:\" of the second storage medium 220. Images C-1, C-2, and C-3 stored in the third storage medium 230 are vertically displayed below the identification name "C:\" of the third storage medium 230.

Figure 4:
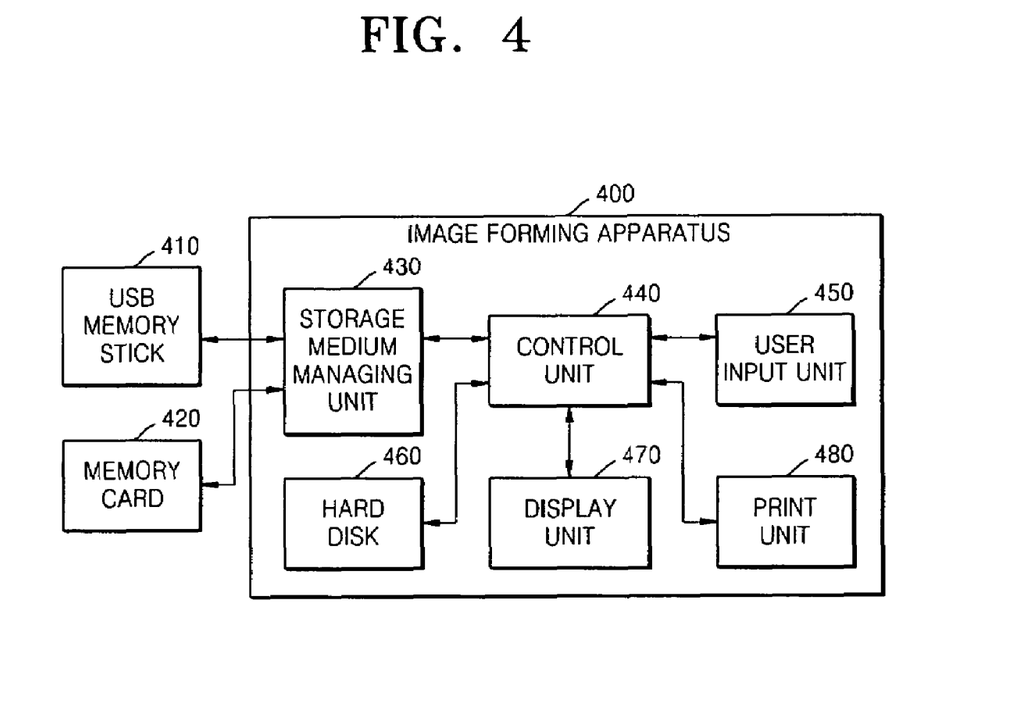
FIG. 4 is a block diagram of an image forming apparatus having a device for managing images, according to an exemplary embodiment of the present invention.

FIG. 4 is a block diagram of an image forming apparatus 400 having a device for managing images, according to an exemplary embodiment of the present invention. The image forming apparatus 400 includes a storage medium managing unit 430, a control unit 440, a user input unit 450, a hard disk 460, a display unit 470, and a print unit 480. The operation of the image forming apparatus 400 of FIG. 4 will be described with reference to FIG. 10 which is a flowchart of a method of managing images, according to an exemplary embodiment of the present invention.

When a USB memory stick 410 and a memory card 420 are connected to the image forming apparatus 400, the storage medium managing unit 430 initializes the USB memory stick 410 and the memory card 420 under the control of the control unit 440, and initializes the file system of the USB memory stick 410 and the memory card 420 using information on the storage media. The initializing operations may be performed concurrently.

Figure 10:
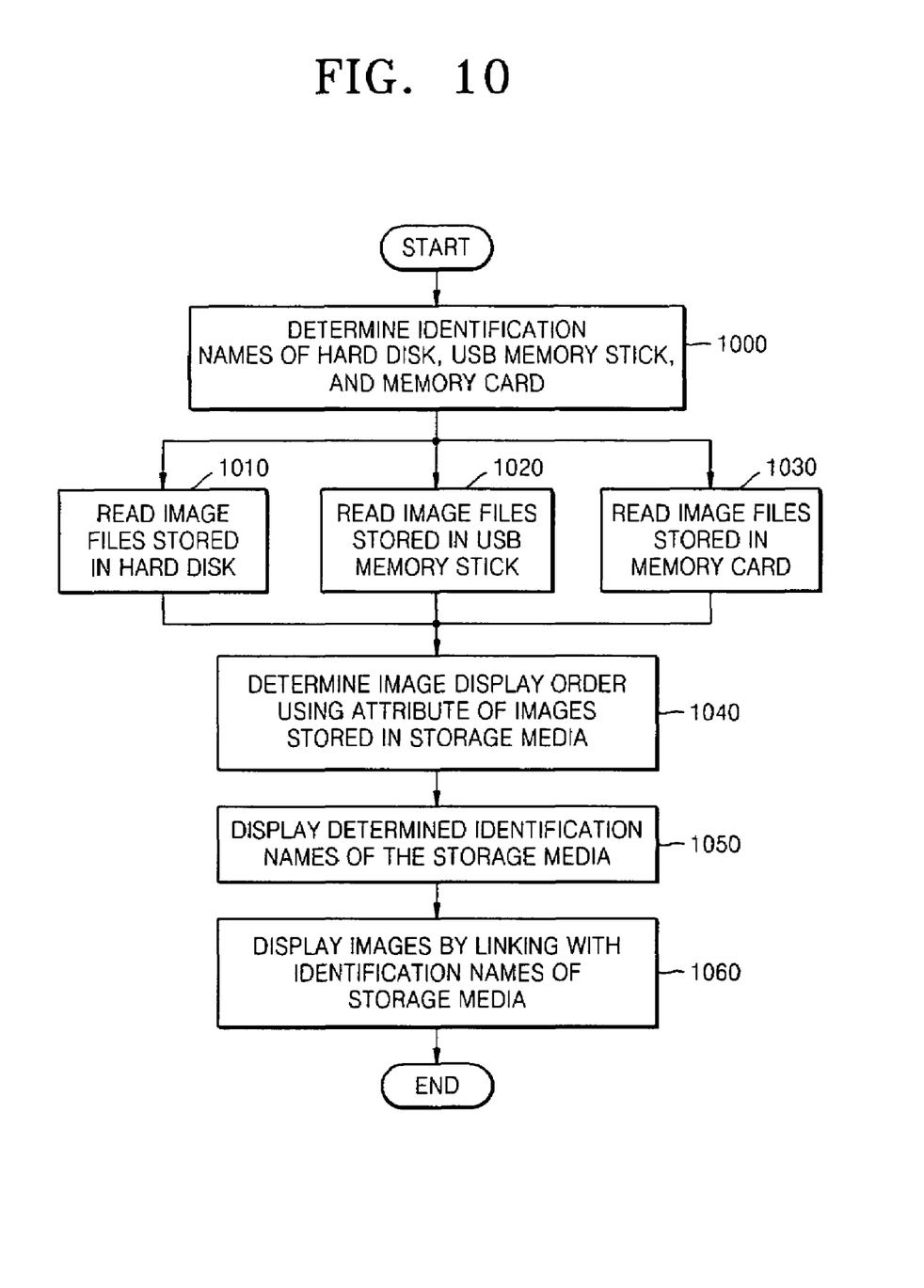
FIG. 10 is a detailed flowchart illustrating a method of managing images, according to an exemplary embodiment of the present invention.

The control unit 440 determines the identification names of the hard disk 460, the USB memory stick 410, and the memory card 420, which are included in or connected to the image forming apparatus 400 (step 1000). The identification names may be determined using a manufacturer's name, a product name, or other information on the storage media.

The storage medium managing unit 430 searches the hard disk 460 to read image files stored in the hard disk 460 (step 1010), searches the USB memory stick 410 to read image files stored in the USB memory stick 410 (step 1020), and searches the memory card 420 to read image files stored in the memory card 420 (step 1030). As illustrated in FIG. 10, the steps 1010, 1020, and 1030 may be concurrently performed.

The control unit 440 determines a display order of the image files read from the storage media (step 1040). The display order may be determined according to an image date, a file format, a file name, or Exif information. For example, if ten image files are read from the hard disk 460, the display order of the ten image files may be displayed in the order of the image date. Image attribute information determining the display order may be included in the image files or may be read from each storage medium, along with the image files.

Under the control of the control unit 440, the display unit 470 displays identification names of storage media 410, 420, and 460 (step 1050), links images read from the storage media 410, 420, and 460 with the displayed identification names of each storage medium, and displays the images in the order determined as described above (step 1060). The displayed images may be thumbnail images included in image files read from the storage media. Also, image data read form the storage media may be reduced or enlarged according to the size of an image display area. The size of the image display area varies according to the number of images which are concurrently displayed on the display unit 470. Thus, the control unit 440 may estimate the size of a display area for one image and then enlarge or reduce the thumbnail images or the images read from the storage media according to the estimated size of the display area.

Figure 5:
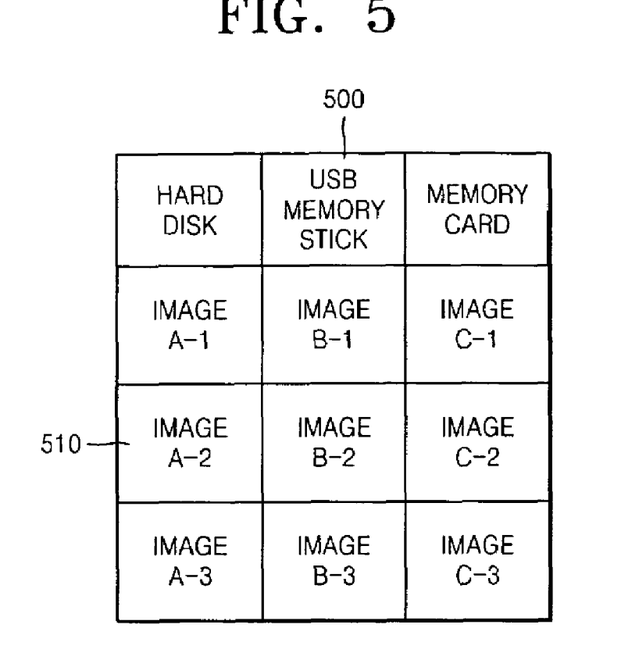
FIG. 5 illustrates a method of displaying images stored in storage media according to identification names of a plurality of storage media, according to another exemplary embodiment of the present invention.

FIG. 5 illustrates a method of displaying images stored in the storage media according to the identification names of the storage media 410, 420, and 460, according to another exemplary embodiment of the present invention. Here, product names of storage media are horizontally displayed as identification names, and images stored in the storage media corresponding to the displayed identification names are vertically displayed.

Figure 6A:
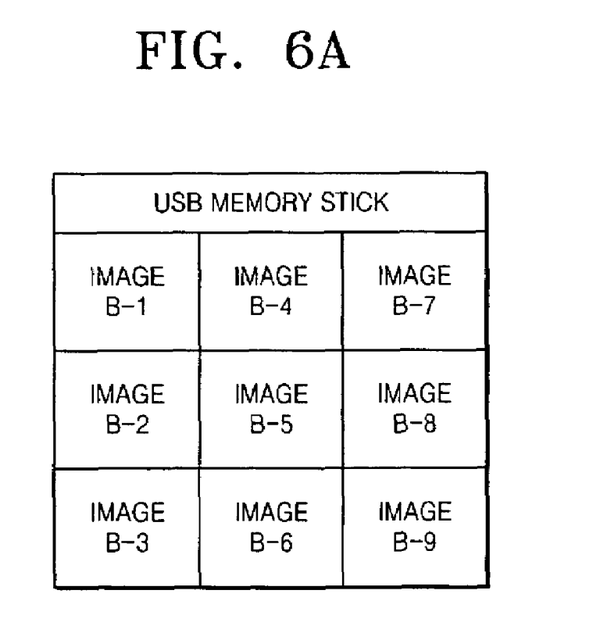
FIGS. 6A and 6B illustrate a method of displaying images stored in a storage medium according to a user's selection, according to exemplary embodiments of the present invention.

FIG. 6A illustrates a method of displaying images stored in a storage medium which is selected by the user input unit 450 and included in or connected to the image forming apparatus, according to an exemplary embodiment of the present invention. A user selects an identification name 500 through the user input unit 450 corresponding to the USB memory stick 410 from the identification names of the storage media of FIG. 5. As illustrated in FIG. 6A, when the user selects the identification name 500 corresponding to the USB memory stick 410, images stored in the USB memory stick 410 are displayed. If a plurality of directories are created in the USB memory stick 410, and image files are stored under the plurality of directories, then the display unit 470 may display the plurality of directories, and then display images stored in the corresponding directories.

Figure 6B:
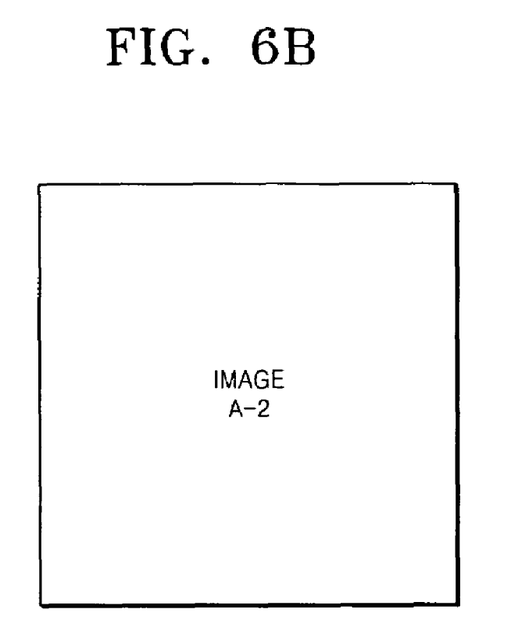

When the user selects any one of images displayed on the display unit 470 through the user input unit 450, the selected image is displayed on the whole screen of the display unit 470. For example, as illustrated in FIG. 6B, if the user selects an image A-2 510, the image A-2 is displayed on the whole screen of the display unit 470.

The storage medium managing unit 430 reads the selected image file from the storage media and the print unit 480 prints the selected image using the read image file if printing is requested after any one of the displayed images is selected as described above.

When a new storage medium is connected to the image forming apparatus 400, the storage medium managing unit 430 initializes the new storage medium under the control of the control unit 440, and initializes a file system of the storage medium using information on the storage medium. When the initializing operation is completed, the control unit 440 determines an identification name of the new storage medium, and reads stored image files from the new storage medium through the storage medium managing unit 430. The control unit 440 determines a display order of the read image files using the image attribute information. To update a display, the control unit 440 controls the display unit 470 so the identification name of the new storage medium and the images stored in the new storage medium are displayed along with the identification names of the displayed storage media and the images stored in the storage media.

Figure 7A:
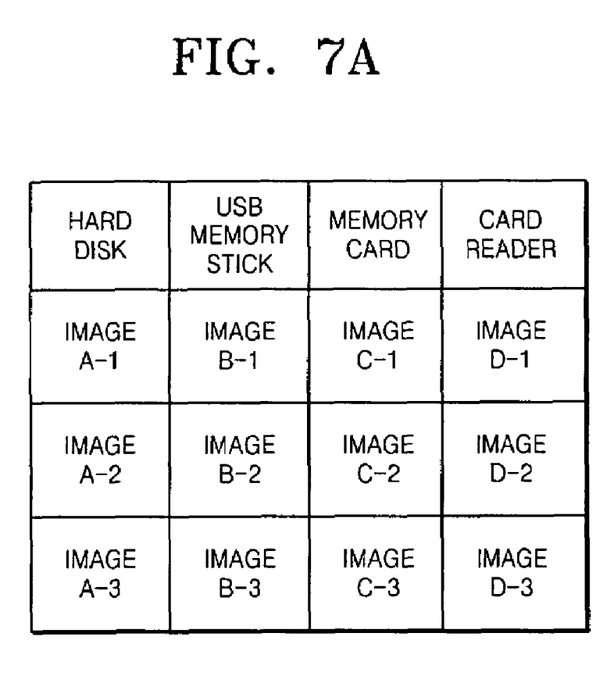
FIGS. 7A and 7B illustrate a method of updating an image display when a storage medium is connected to or disconnected from an image forming apparatus, according to exemplary embodiments of the present invention.

FIG. 7A illustrates a method of updating an image display when a storage medium is connected to an image forming apparatus, according to an exemplary embodiment of the present invention. According to an exemplary implementation, a card reader is additionally connected to the image forming apparatus 400 of FIG. 4. As illustrated in FIG. 7A, the "card reader" that is an identification name of the new storage medium is added in a row for displaying identification names, and the images stored in a card inserted in the card reader are vertically displayed in the column corresponding to the "card reader". When the display is updated due to the new storage medium, the size of the display area decreases by as much as one image. Thus, the control unit 440 reduces the displayed images to adjust them to the decreased size of the display area and be redisplayed.

When the storage medium connected to the image forming apparatus 400 is disconnected, the storage medium managing unit 430 deletes a file system of the removed storage medium and all stored information on the storage medium, under the control of the control unit 400. To update the display, the control unit 440 controls the display unit 470 so the identification name of the removed storage medium and the corresponding images are removed from the identification names of the displayed storage media.

Figure 7B:
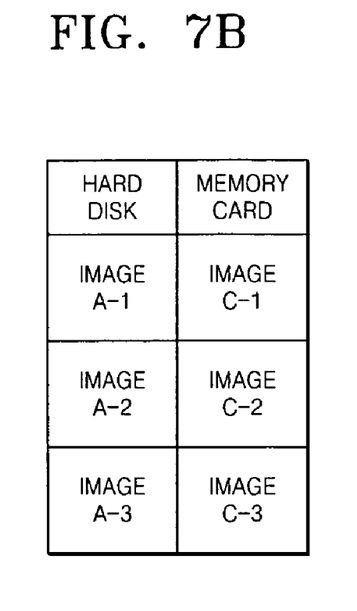

FIG. 7B illustrates a method of updating an image display when a storage medium is disconnected from an image forming apparatus, according to an exemplary embodiment of the present invention. According to an exemplary implementation, the USB memory stick 410 is disconnected from the image forming apparatus 400 of FIG. 4. As illustrated in FIG. 7B, an identification name of the USB memory stick 410 and images corresponding to the identification name are removed from the display. When the display is updated due to disconnection of the storage medium, the size of the display area increases by as much as one image. Thus, the control unit 440 enlarges the displayed images to adjust them to the increased size of the display area and to be redisplayed.

Figure 8:
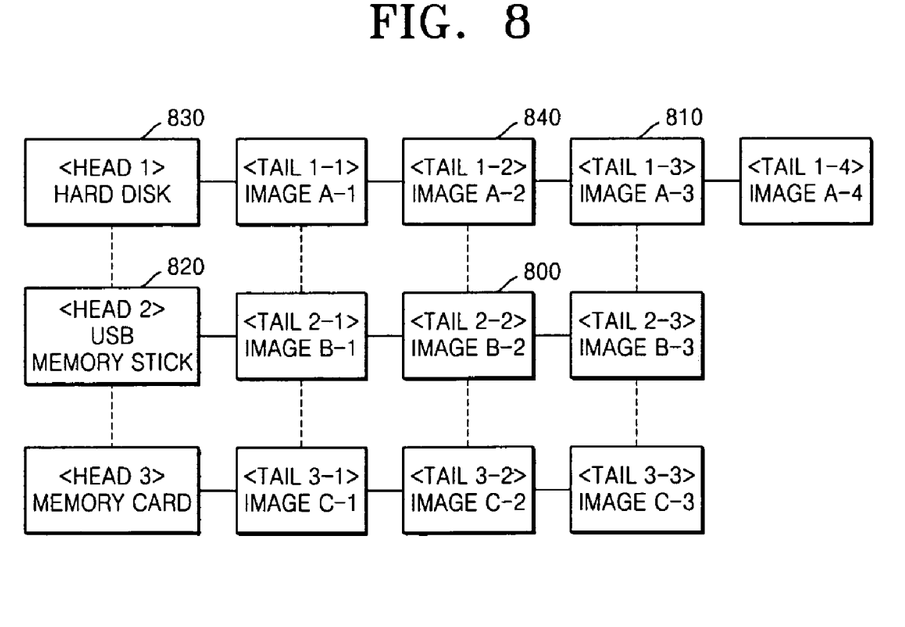
FIG. 8 illustrates a data structure for managing identification names of a plurality of storage media and image information stored in the storage media, according to an exemplary embodiment of the present invention.

The identification names of the displayed storage medium and information on the images corresponding to the storage medium may be stored in and managed by a temporary storage medium (not shown) included in the image forming apparatus 400. FIG. 8 illustrates a data structure for managing identification names and image information of a plurality of storage media in the temporary storage medium (not shown). According to an exemplary implementation, the identification names of the storage media are linked using heads, and the information on the images corresponding to the identification names are linked using tails connected to the heads. As illustrated in FIG. 8, the storage media included in or connected to the image forming apparatus 400 has its head at the same location. In each head, information on the images stored in the corresponding storage media is linked using tails. In addition, adjacent tails linked to different heads may be linked with each other. A link between image information stored in the same storage media is indicated by a solid line, and a link between image information stored in the different storage media is indicated by a dotted line.

The image information stored in the different storage medium may be promptly transferred via the link between the image information stored in the different storage media. For example, when information (tail 1-3) 810 on the image A-3 is accessed while information (tail 2-2) 800 on the image B-2 is accessed, the information (tail 1-3) 810 on the image A-3 can be accessed via the tail 1-2 840 through the dotted lined link, without accessing the tail 1-3 810 via a head-2 820 and a head-1 830.

Although the identification names of the storage media are horizontally displayed, and the information on the images stored in the storage media are vertically displayed in the aforementioned description, the identification names of the storage media and the information on the images may be displayed in an opposite way. The user may choose whether the identification names of the storage media will be horizontally or vertically displayed.

In order to manage the images stored in the plurality of storage media included in or connected to the image forming apparatus through one display screen, the plurality of storage media may be concurrently controlled. Namely, the image data of the plurality of storage media may perform read/write operations at the same time.

Figure 11:
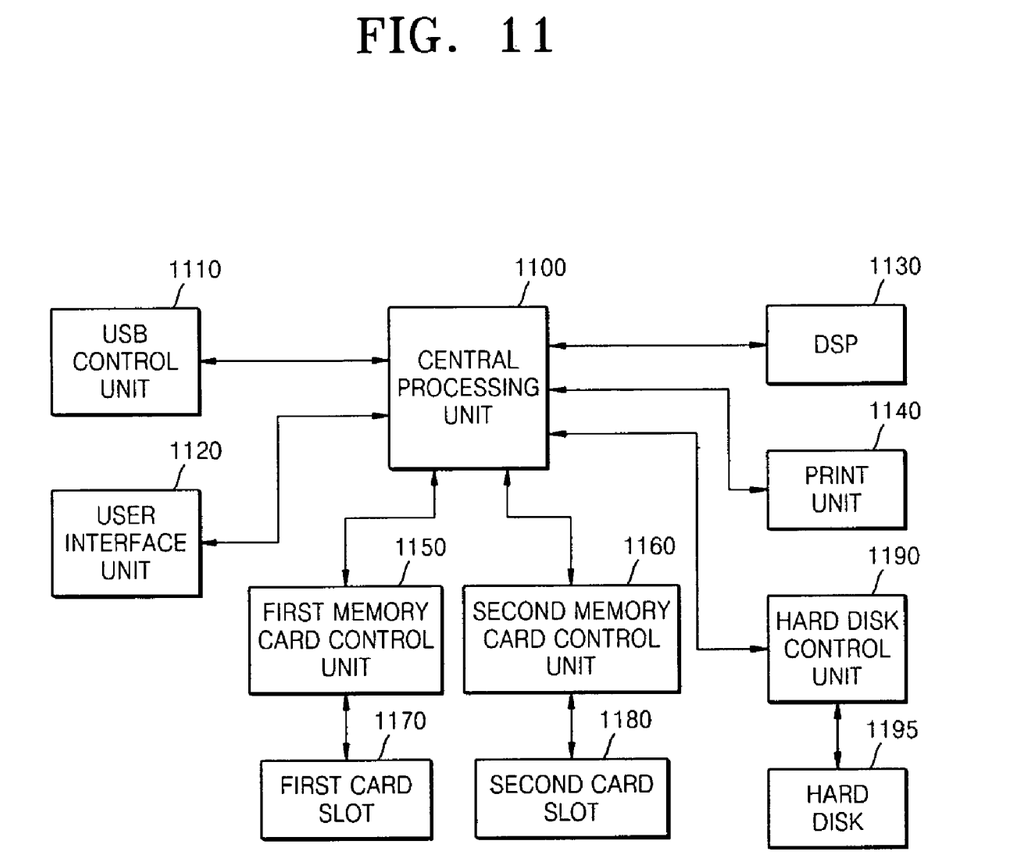
FIG. 11 is a block diagram of an image forming apparatus including a device for concurrently controlling a plurality of storage media, according to an exemplary embodiment of the present invention.

FIG. 11 is a block diagram of an image forming apparatus including a device for concurrently controlling a plurality of storage media, according to an exemplary embodiment of the present invention. The image forming apparatus includes a central processing unit 1100, a USB control unit 1110, a user interface unit 1120, a DSP 1130, a print unit 1140, a first memory card control unit 1150, a second memory card control unit 1160, a first card slot 1170, a second card slot 1180, a hard disk control unit 1190, and a hard disk 1195.

The central processing unit 1100 which controls overall operations of the image forming apparatus controls the USB control unit 1110, the user interface unit 1120, the DSP 1130, the print unit 1140, the first and second memory card control units 1150 and 1160, and the hard disk control unit 1190. The user interface unit 1120 receives an input of a specific function or value, and displays a screen for providing information through a display unit such as a liquid crystal display (LCD). The DSP 1130 performs image processing for image data read from a storage medium, and coverts the image data into a desired format of printable image data. The print unit 1140 prints the converted image data.

The USB control unit 1110 controls external storage media which use the USB memory stick connected to the image forming apparatus, so that a USB storage medium is powered and initiated, and data read/write operations are then performed with respect to the USB storage medium.

The first and second memory card control units 1150 and 1160 verify whether a memory card is inserted into the first and second card slots 1170 and 1180. This facilitates the initialization of the memory card and the performance of the data read/write operations with respect to the memory card. The memory card connected to the image forming apparatus through the first and second card slots 1170 and 1180 may be a compact flash (CF) memory card, a smart media (SM) memory card, an extreme digital (XD) memory card, a memory stick (MS), a secure digital (SD) memory card, and a multimedia card (MMC).

The hard disk control unit 1190 controls the hard disk 1195 included in the image forming apparatus, so that the hard disk 1195 is initialized, and data read/write operations are then performed with respect to the hard disk 1195.

As described above, the plurality of storage media included in or connected to the image forming apparatus are respectively controlled by independent control units. The control units controlling the storage media are also operated in response to independent control signals without interference. The plurality of storage media included in or connected to the image forming apparatus may be concurrently controlled due to these independent control units.

Referring to FIG. 11, the USB storage medium connected to the image forming apparatus, a first memory card connected to the first card slot 1170, a second memory card connected to the second card slot 1180, and the hard disk 1195 are respectively controlled by independent control units including the USB control unit 1110, the first memory card control unit 1150, the second memory card control unit 1160, and the hard disk control unit 1190. Control signals for controlling the control units 1110, 1150, 1160, and 1190 are independently generated by the central processing unit 1100.

Figure 12:
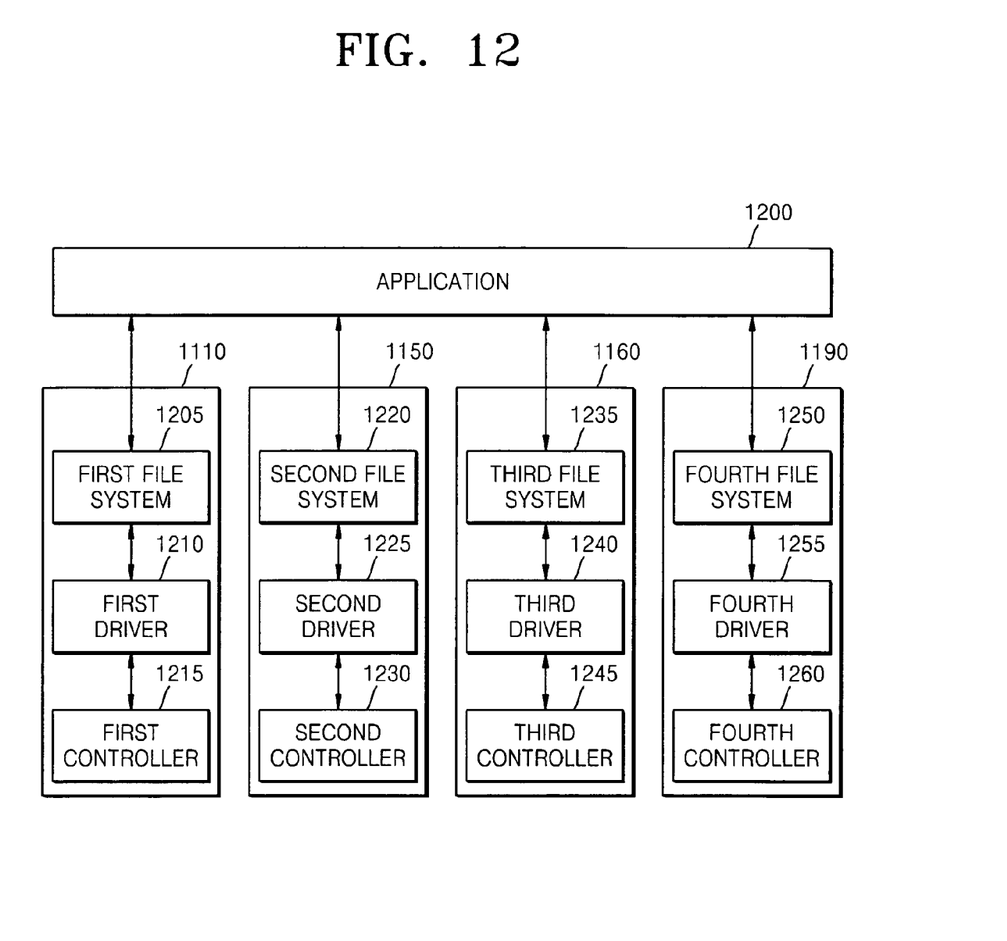
FIG. 12 is a block diagram of control units for concurrently controlling the plurality of storage media, according to an exemplary embodiment of the present invention.

FIG. 12 is a block diagram of control units for concurrently controlling the plurality of storage media, which are the USB control unit 1110, the first memory card control unit 1150, the second memory card control unit 1160, and the hard disk control unit 1190, according to an exemplary embodiment of the present invention. The control units 1110, 1150, 1160, and 1190 each have a file system, a driver, and a controller. The USB control unit 1110 includes a first file system 1205, a first driver 1210, and a first controller 1215. The first memory card control unit 1150 includes a second file system 1220, a second driver 1225, and a second controller 1230. The second memory card control unit 1160 includes a third file system 1235, a third driver 1240, and a third controller 1245. The hard disk control unit 1190 includes a fourth file system 1250, a fourth driver 1255, and a fourth controller 1260.

The control units 1110, 1150, 1160, and 1190, and the file systems, the drivers, and the controllers included in the control units are independently operated.

When the USB storage medium is connected to the image forming apparatus, the first driver 1210 verifies device information of the connected USB storage medium through the first controller 1215. The first driver 1210 then initializes the USB storage medium. In the initiating process, the driver 1210 analyses attribute information on the USB storage medium, such as capacity, write protect, sector size, manufacturer, and serial number. When read/write operations are facilitated in the USB storage medium, the driver 1210 provides an application programming interface (API) through which the USB storage medium is controlled and which has the attribute information on the storage medium.

An application 1200 initiates the first file system 1205 through the API. In the initiating process, the first file system 1205 stores a file system configuration. For example, the first file system 1205 stores necessary information, such as file location, memory card capacity, and sector size, for controlling the storage media.

When the initializing process is completed for the USB storage medium and the first file system 1205, a desired operation of the application 1200 is performed with respect to the USB storage medium. Specifically, the first driver 1210 generates instruction signals for performing operations requested from the application 1200 according to a control sequence or a protocol of the connected USB storage medium. The first controller 1215 also performs the requested operations, such as power supplying, initializing, and data read/write operations in response to the generated instruction signals.

When a memory card is inserted into the first card slot 1170, the second driver 1225 supplies power to the inserted memory card, and performs the initializing process so that the card can be accessed, as in the case of the aforementioned USB storage medium. The second file system 1220 is initialized by the application 1200. When the initializing process is completed, the desired operation of the application 1200 can be performed with respect to the inserted memory card through the second driver 1225 and the second controller 1230, as in the case of the USB storage medium.

When the memory card is inserted into the second card slot 1180, power is supplied, the memory card and the third file system 1235 are initialized, and then the read/write operations are performed with respect to the memory card.

The fourth driver 1255 supplies power to the hard disk 1195 and performs the initializing process. The application 1200 initializes the fourth file system 1250. When the initializing process is completed, the hard disk 1195 can be controlled.

Initializing operations and instruction signal generating operations for each of the first, second, third, and fourth drivers 1210, 1225, 1240, and 1265 are independently performed without interference. Also, initializing operations and instruction signal generating operations of the application 1200 for each of the first, second, third, and fourth file systems 1205, 1220, 1235, and 1250 are independently performed without interference. Also, data read/write operations of the first, second, third, and fourth controller 1215, 1230, 1245, and 1260 for the storage media are independently performed without interference.

The plurality of storage media included in or connected to the image forming apparatus may be concurrently controlled due to the independent file systems, drivers, and controllers for the storage media.

According to an exemplary embodiment of the present invention, identification names of a plurality of storage media included in or connected to an image forming apparatus are displayed by linking information on images with the identification names. This facilitates the management of the images stored in the storage media. Therefore, a user can conveniently and promptly recognize and manage the storage media and the images stored in the storage media.

The invention may also be embodied as computer readable codes on a computer readable recording medium. The computer readable recording medium is any data storage device that can store data which may be subsequently read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems to facilitate the storage and execution in a distributed fashion of the computer readable code. Also, functional programs, codes, and code segments for accomplishing exemplary embodiments of the present invention can be easily construed by programmers skilled in the art to which the present invention pertains.

While the present invention has been particularly shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of managing images to be printed by an image forming apparatus, comprising:
   determining whether at least one of storage media are connected to the image forming apparatus;
   displaying identification names of a plurality of storage media included in or connected to the image forming apparatus; and
   linking information on images stored in the plurality of storage media with the identification names of the plurality of storage media and displaying the information on images stored in the plurality of storage media,
   wherein the identification names of the storage media are displayed in at least one of a first alignment manner and a second alignment manner;
   wherein the identification names of the storage media displayed in a first alignment manner are horizontally displayed and the information on the images stored in the storage media is displayed vertically in a column of the corresponding identification names of the storage media; and
   wherein the identification names of the storage media displayed in a second alignment manner are vertically displayed and the information on the images stored in the storage media is horizontally displayed in a row of the corresponding storage media.

2. The method of claim 1, wherein the plurality of storage media comprise at least one of a hard disk, a memory card, a universal serial bus (USB) memory stick, and a card reader.

3. The method of claim 1, wherein the information on images is displayed in at least one of an enlarged and a reduced form so that the images are adjusted according to the size of an image display area.

4. The method of claim 1, wherein at least one of the first alignment manner and the second alignment manner is selected by a user.

5. The method of claim 1, wherein, when two and more images are stored in the storage media, the displaying information on images comprises:
   determining a display order of the images according to at least one of an image date, a file format, a file name, and exchangeable image file (Exif) information; and
   displaying the information on the images according to the determined display order.

6. The method of claim 1, further comprising:
   inputting any one of the displayed identification names of the storage media by a user; and
   displaying images stored in a storage medium corresponding to the input identification name.

7. The method of claim 6, wherein the displaying images comprises:
   displaying directory names of the storage media; and
   linking information on images stored in each directory with the displayed directory names and
   displaying the information on images stored in each directory.

8. The method of claim 1, further comprising:
   selecting any one of the images corresponding to the displayed image information;
   reading the selected image from the storage media where the image is stored; and printing the selected image.

9. The method of claim 1, further comprising:
   verifying whether a storage medium has been connected to or disconnected from the image forming apparatus; and
   arranging the size of a display area for displaying information of one image according to the number of storage media included in or connected to the image forming apparatus, when a result of the verifying indicates that the storage medium has been connected to or disconnected from the image forming apparatus.

10. The method of claim 1, wherein the identification names of the storage media and the information on the images are respectively linked using heads and tails connected to the heads, and are stored in and managed by the image forming apparatus.

11. An image forming apparatus for managing images to be printed, comprising:
   a plurality of storage media included in or connected to the image forming apparatus;
   a storage medium managing unit for reading information on images stored in a plurality of storage media included in or connected to the image forming apparatus;
   a control unit for determining identification names of the plurality of storage media and respectively linking the images stored in the storage media with the identification names of the storage media; and a display unit for displaying the identification names of the plurality of storage media and the image information;

wherein the display unit horizontally displays the identification names of the storage media in at least one of a first alignment manner and a second alignment manner;

wherein the identification names of the storage media in the first alignment manner are horizontally displayed and the information on the images stored in the storage media is displayed vertically in a column of the corresponding identification names of the storage media; and wherein the identification names of the storage media in the second alignment manner are vertically displayed and the information on the images stored in the storage media is horizontally displayed in a row of the corresponding identification names of the storage media.

12. The image forming apparatus of claim 11, wherein the plurality of storage media comprise at least one of a hard disk, a memory card, a universal serial bus (USB) memory stick, and a card reader.

13. The image forming apparatus of claim 11, wherein the information on images is displayed in at least one of an enlarged and a reduced form so that the images are adjusted according to the size of an image display area.

14. The image forming apparatus of claim 13, wherein at lest one of the first alignment manner and the second alignment manner is selected by a user.

15. The image forming apparatus of claim 11, wherein, when two and more images are stored in the storage media, the control unit determines a display order of the images according to at least one of an image date, a file format, a file name, and exchangeable image file (Exif) information, and displays the information on the images according to the determined display order.

16. The image forming apparatus of claim 11, wherein the storage medium managing unit verifies a storage medium's connection to or disconnection from the image forming apparatus, and the control unit arranges the size of a display area for displaying information of one image according to the number of storage media included in or connected to the image forming apparatus, when the result of verifying indicates that the storage medium has been connected to or disconnected from the image forming apparatus.

17. The image forming apparatus of claim 11, wherein the storage medium managing unit concurrently accesses the plurality of storage media.

18. The image forming apparatus of claim 11, further comprising a user input unit for selecting any one of images displayed on the display unit.

19. The image forming apparatus of claim 11, further comprising a print unit for printing a selected image if printing is requested after any one of displayed images is selected.

20. A method of managing images of an image forming apparatus which includes at least one of internal storage media and a display unit displaying at least one of images, comprising:

determining whether at least one of external storage media are connected to the image forming apparatus;

providing at least one of the internal storage media and at least one of the external storage media with a identification name respectively;

linking information on images stored in at least one of the internal storage media and at least one of the external storage media with the identification names of at least one of the internal storage media and at least one of the external storage media;

displaying the information on images stored in at least one of the internal storage media and at least one of the external storage media, wherein the identification names of the storage media are displayed in at least one of a first alignment manner and a second alignment manner; wherein the identification names of the storage media displayed in a first alignment manner are horizontally displayed and the information on the images stored in the storage media is displayed vertically in a column of the corresponding identification names of the storage media; and wherein the identification names of the storage media displayed in a second alignment manner are vertically displayed and the information on the images stored in the storage media is horizontally displayed in a row of the corresponding storage media.

* * * * *